April 30, 1968

L. W. WADDY 3,380,326

TOOLHOLDER

Filed May 2, 1966

INVENTOR
LEWIS W. WADDY

BY *Hoffmann and Yount*

ATTORNEYS

April 30, 1968  L. W. WADDY  3,380,326
TOOLHOLDER

Filed May 2, 1966  2 Sheets-Sheet 2

INVENTOR
LEWIS W. WADDY
BY Hoffmann and Yount
ATTORNEYS

United States Patent Office 3,380,326
Patented Apr. 30, 1968

3,380,326
TOOLHOLDER
Lewis W. Waddy, Cleveland, Ohio, assignor to The Warner & Swasey Company, Cleveland, Ohio, a corporation of Ohio
Filed Mar. 2, 1966, Ser. No. 531,309
6 Claims. (Cl. 82—34)

The present invention relates to a toolholder, and particularly to a toolholder having means for effecting an accurate positioning of a cutter holder supported thereby.

The principal object of the present invention is the provision of a new and improved toolholder for supporting a cutter holder and which includes a stop member which is readily and accurately positioned and against which the cutter holder is positioned to effect an accurate positioning of the cutter holder and means for clamping the cutter holder to the toolholder when positioned against the stop.

A further object of the present invention is the provision of a new and improved toolholder having a support with openings therein for receiving a shank portion of a cutter holder and a stop member is mounted on the toolholder and positioned to engage a surface portion of the shank of the cutter holder as the shank is moved relative to the support, and wherein a micrometer adjustment mechanism is provided for accurately positioning the stop member to thereby effect accurate positioning of the cutter holder.

A still further object of the present invention is the provision of a new and improved toolholder, as noted in the next preceding paragraph, wherein the toolholder includes a plate member secured to the toolholder and which is adapted to carry a stop member in alignment with the tool receiving openings in the toolholder and the stop member is adjustable to provide for a fine accurate positioning of the stop member.

Another object of the present invention is the provision of a new and improved toolholder including a tool support portion for supporting a cutter holder and wherein the cutter holder may be accurately positioned relative to the toolholder and when so positioned is clamped to the toolholder by a clamping mechanism which includes wedge members which move toward each other and move a clamping member radially inwardly relative to a shank portion of the cutter holder to securely clamp the shank portion of the cutter holder in an opening in the toolholder.

Further objects and advantages of the present invention will be apparent to those skilled in the art to which it relates from the following detailed description of the preferred embodiment thereof, made with reference to the accompanying drawings forming a part of this specification and in which.

The present invention provides an improved toolholder for use in a machine tool, and particularly for supporting a cutter holder in position so that the cutter carried by the cutter holder accurately engages the workpiece. The toolholder embodying the present invention may be used in a variety of different types of machine tools. However, for illustrative purposes only, the present invention will be described herein-below as applied to a particular machine tool 10.

Figure 1:
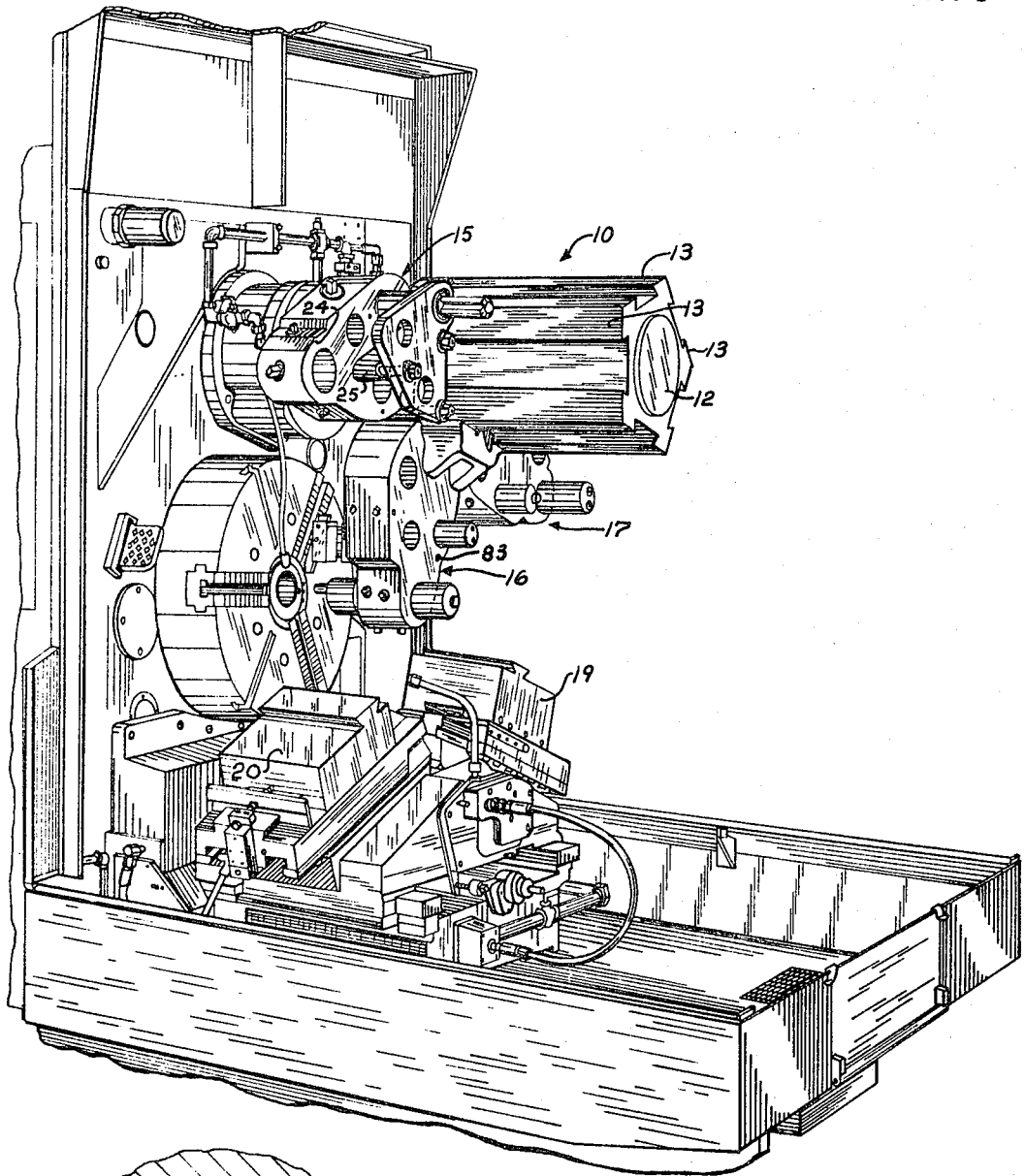
FIG. 1 is a perspective view of a machine tool in corporating a toolholder embodying the present invention.
Figure 5:
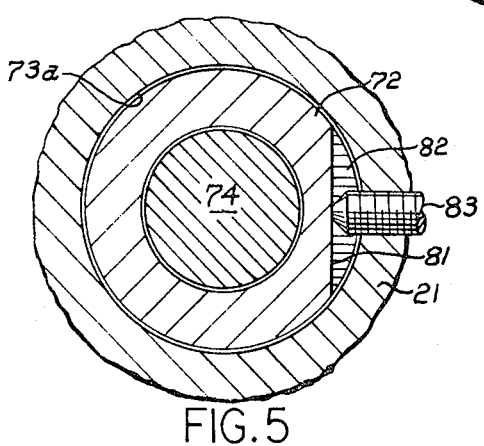
FIG. 5 is a fragmentary sectional view of another portion of the toolholder, taken approximately along the section line 5—5 of FIG. 4.

The machine tool 10 includes a spindle, not shown, on which a chuck 11 is mounted for supporting a workpiece in position and for effecting rotation of the workpiece. The machine tool 10 also includes a turret 12 adapted to carry toolholders on its tool supporting surfaces 13, and FIG. 1 shows three toolholders designated 15, 16 and 17, supported on different tool supporting surfaces of the turret 12. The turret 12 is mounted for rotation about a generally horizontal axis in order to locate the tool supporting surfaces 13 thereof in machining position, and moves axially along its axis of rotation so as to effect engagement of the tools with the rotating workpiece. The machine 10 also includes suitable cross slides, designated 19, 20, also adapted to carry tools for engaging the workpiece.

The toolholder 15 shown in FIG. 1 is a multiple toolholder and includes a tool support 21. The support 21 carries a suitable clamp mechanism 22 for securing the toolholder 15 in a dovetail groove in a work supporting surface 13 of the turret 12. The clamp mechanism 22 may take any suitable form and preferably is as shown in copending United States application Ser. No. 468,477, entitled "Toolholder," filed June 30, 1965 in the name of Michael W. Papp, and assigned to the same assignee as the present invention. Thus, the clamp mechanism 22 will not be described in detail herein. The support or body portion 21 of the toolholder 15 extends away from the axis of rotation of the turret and has opposite faces 23, 24 which face toward the chuck 11 and away from the chuck 11, respectively. The face 24 has embossments or projections 25 formed thereon which project away from the face 24 outwardly of the toolholder.

The toolholder 15, as noted above, is adapted to support tools and has a plurality of tool receiving openings 26–29 therein. The openings 26–29 intersect the opposite faces 23, 24 and extend in the direction of movement of the turret 12. The tools which are received in the openings may take different forms and the drawings illustrate a cutter holder 40 supported in opening 26. The cutter holder 40 includes a shank portion 41 which is slidably received within the tool receiving opening 26 and carries on one end thereof a cutter holding block 42 which supports a cutting tool 43 adapted to engage a rotating workpiece.

The cutter holder 40 may be readily mounted in the support 21 when the turret 12 is in its position outwardly of that shown in FIG. 1 wherein the toolholders are spaced away fromt he spindle. When in this position, the cutter holder shank 41 is inserted through the desired openings 26–29. Different types of cutter holders may be located in the openings 26–29 to operate simultaneously on the workpiece, and preferably the opening 29 which substantially aligns with the axis of rotation of the workpiece is reserved for tools, such as drills, and working tools which along the axis of the workpiece. The cutting tools supported in openings 26–28, on the other hand, generally engage the outer periphery of the workpiece. These cutting tools, such as cutting tool 43, must be accurately positioned relative to the support 21 of the toolholder 15 so as to engage the rotating workpiece at a proper and accurate location. To this end, the toolholder 15 includes a means for accurately positioning the cutter holder 40 relative to the support 21.

Figure 2:
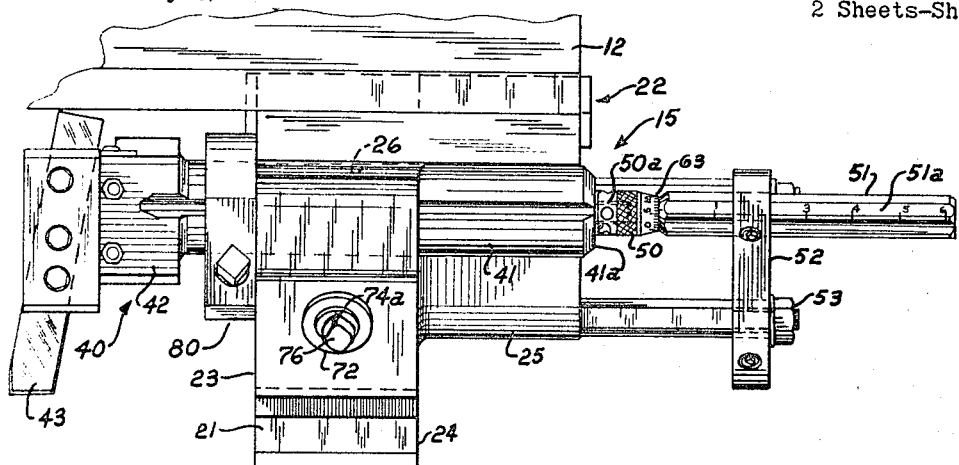
FIG. 2 is a side elevational view of a toolholder embodying the present invention.
Figure 3:
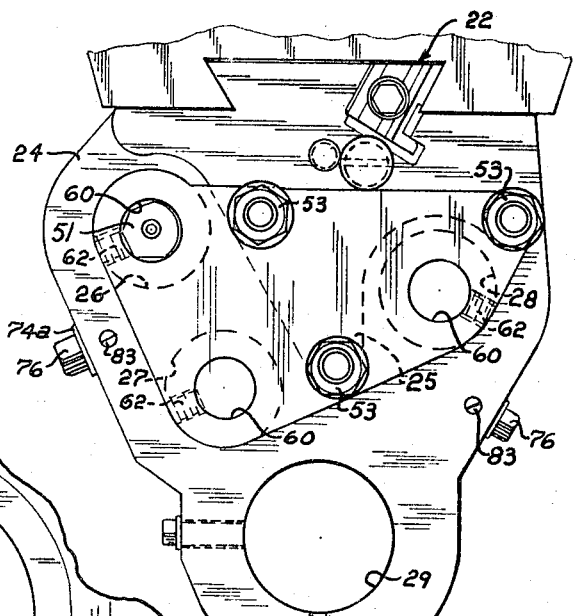
FIG. 3 is an end view of the toolholder shown in FIG. 2 looking at the toolholder in FIG. 2 from the right.

The means for effecting accurate positioning of the toolholder includes a stop member 50 engageable with the end surface 41a of the shank 41 of the cutter holder 40 as the cutter holder is moved relative to the toolholder 15 in opening 26. This engagement, of course, limits movement of the cutter holder 40 in one direction, namely, to the right, as viewed in FIG. 2. The stop member 50 is carried on one end of a rod member 51 which is supported in a support plate 52 secured to one side of the support 21. The support plate 52 is fastened by suitable screws 53 to the projections 25 of the support 21. As best shown in FIG. 3, there are three screws 53 for securing the support plate 52 in position. Moreover, it should be apparent from FIG. 3 that the support plate 52 extends and is spaced so as to be in alignment with the openings 26–28 in the support 21.

The rod 51 which carries the stop member 50 may be located in an opening 60 in alignment with a tool receiving opening in the support 21. As shown in FIG. 3, there are three such openings 60 formed in the support plate 52 with each opening being in alignment with a corresponding opening in the support 21 of the toolholder 15. The rod member 51 may be secured in the opening 60 with the stop member 50 thereof projecting toward the opening for receiving the shank 41 of the cutter holder 40 and is releasably secured therein by suitable means, preferably setscrews, designated 62. A separate rod member 51 may be located in each opening 60.

The rod member 51 is suitably graduated along one side thereof, as indicated at 51a, so as to indicate the position of the rod member relative to the plate 52. A rough positioning of the stop member 50 may be effected by releasing the setscrews 62 and moving the rod relative to the plate until the graduation indicates a particular location of the stop. The stop member 50 may be accurately or finely positioned relatively to the support 21 and has threads cooperating with threads on the rod member which provide for relative movement therebetween upon rotation of the stop. The threaded interconnection is designated 50a in FIG. 2. The stop member 50 may be moved toward and away from the support 21 of the toolholder 15 upon rotation thereof and the stop member may be moved a specific distance through the use of indications 63 which indicate the amount of movement of the stop member 50 relative to the rod 51. This structure constitutes a fine or micrometer adjustment for the stop member 50.

From the above, it should be apparent that the cutter holder 40 is positioned accurately relative to the support 21 through the use of the accurately positioned stop member 50. The cutter holder 40 is inserted into the desired opening in the support 21 of the toolholder and moved relative to the toolholder until the outermost end surface 41a of the shank portion 41 of the cutter holder 40 engages the stop member 50. The stop member 50 is accurately positioned so as to limit movement of the shank portion 41 when the cutter holder 40 has been accurately positioned relative to the support 21. Moreover, the particular position of the stop ember may be recorded for repositioning of the same cutter holder accurately when the same job is performed again, assuming, of course, that the cutter 43 has been preset to the same position in the cutter holder 40.

Figure 4:
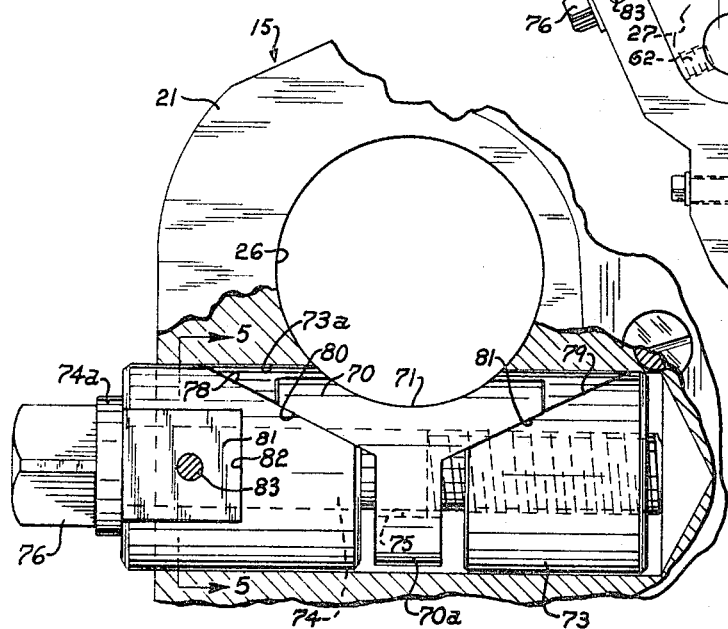
FIG. 4 is a fragmentary sectional view of a portion of the toolholder shown in FIG. 3.

When the cutter holder 40 has been accurately positioned relative to the support 21, the cutter holder is clamped in position and is thus fixedly and rigidly secured to the support 21 so that in the machining operation, the cutter holder 40 is not loosened and does not move relative to the support 21. The toolholder 15 includes suitable means for clamping the cutter holder in position in the respective openings therein. The specific clamping means is best shown in FIG. 4 and includes a clamping member 70 which moves radially inwardly of the opening with which it is associated and specifically as shown in FIG. 4, moves radially inwardly of the opening 26 in the toolholder. The member 70 has a clamping surface portion 71 which engages the shank 41 of the cutter holder 40 and clamps the cutter holder 40 firmly in the opening 26 in the support 21 when it moves radially inwardly.

The member 70 is moved inwardly of the opening 26 to effect clamping of the cutter holder 40 therein by a pair of generally circular wedge members 72, 73, respectively. The wedge members 72, 73 are located in a bore 73a in the support 21. The wedge member 72, has an opening therein through which a rod member 74 extends. The rod member 74 extends into a threaded opening in the wedge member 73 and has a threaded end cooperating with the threads in the opening in the wedge member 73. The rod member 74 also extends through an opening 75 in a portion 70a of the member 70. The outer end of the rod member 74 has a portion 74a which engages the wedge member 72 and also has a suitable tool engaging portion 76 which when engaged by a suitable wrench, or otherwise, may be rotated. When the rod 74 is rotated in the proper direction, the portion 74a engages the wedge member 72 and moves the wedge member 72 toward the right, as viewed in FIG. 4, while at the same time, the wedge 73 is moved to the left due to the threaded connection therebetween.

The wedge members 72, 73 have inclined surfaces 78, 79, respectively, which are adapted to engage inclined cam surfaces 80, 81, respectively, on the member 70. It should be apparent from the above that when the wedge members 72, 73 move toward each other, the inclined surfaces 78, 79 engage the inclined or cam surfaces 80, 81 on the member 70 and effect movement of the member 70 inwardly of opening 26 so as to effect clamping of the tool cutter holder 40 in the opening 26. Suitable clearance is provided between the rod 74 and surfaces defining openings 75 to permit this relative movement. The cutter holder 40 is released for removal from the opening 26 by moving the wedge members 72, 73 relatively away from each other, thereby relieving the clamping pressure applied by the clamping member 70 to the shank portion 41 of the cutter holder 40. Other well-known means may be employed in order to rigidly secure the cutter holder 40 to the support portion 21 of the toolholder 15, and specifically as shown in FIG. 2 suitable torque collars 80 may be utilized, and which are well known and will not be described herein.

As noted above, the wedge members 72, 73 are located in a bore 73a in the toolholder support 21. Suitable means is provided to prevent the wedge members 72, 73 from accidentally falling out of the bore 73a. To this end, the wedge member 72 is provided with a flat 81 on the outer surface thereof. The flat 81 provides an abutment 82 on the wedge member, and a suitable setscrew 83 is threadedly received in the support portion 21 and projects adjacent to the flat 81 so as to engage abutment 82 and prevent movement of the wedges 72, 73 from the bore 73a. The setscrew 83 also limits rotation of the wedge member 72 in the bore 73a.

From the above, it should be apparent that applicant has provided a new and improved toolholder providing for accurate positioning of the tools carried thereby and wherein the tools are rigidly clamped and secured in their accurate positions. It should be further apparent that applicant has made hereinabove a detailed description of a preferred embodiment of the present invention and it should be understood that certain modifications, changes, and adaptations may be made therein by those skilled in the art to which it relates and it is hereby intended to cover all such modifications, changes, and adaptations which come within the scope of the appended claims.

Having described by invention, I claim:

1. A toolholder comprising a support for supporting a cutter holder, said support having a portion for receiving a portion of the cutter holder with the cutter holder movable relative thereto, a stop member engageable with a part of said cutter holder to limit movement thereof relative to said support in one direction, micrometer adjustment means for adjusting accurately the position of said stop member to effect an accurate positioning of said cutter holder, means for clamping said cutter holder to said support when so accurately positioned and means connected with said support and carrying said stop and including a plate member secured to one side of said support and spaced therefrom and a rod member supported by said plate and carrying said stop.

2. A toolholder as defined in claim 1 further including means releasably securing said rod member to said plate and releasable to provide for adjustment of said rod member relative thereto, and said micrometer adjustment means includes a threaded interconnection between said stop and said rod member.

3. A toolholder as defined in claim 2 wherein said rod member has measurement graduations thereon to indicate a rough positioning of said stop and said micrometer adjustment means includes graduations for indicating a fine positioning of the stop.

4. A toolholder as defined in claim 3 wherein said support has at least one opening therethrough and said portion of said cutter holder comprises a shank received in said opening, and said plate has an opening therein in alignment with the opening in the support for receiving said rod member.

5. A toolholder as defined in claim 4 wherein said clamping means comprises a clamping member having a clamping surface engageable with said shank, and wedge members for moving said clamping member radially inwardly of said opening to securely clamp said shank in said opening.

6. A toolholder to be secured to one face of a machine tool turret which is movable from a retracted position toward a spindle carrying a workpiece comprising a support for supporting a cutter holder, means for securing said support to said turret, said support including opposite surfaces one of which faces said spindle and the other of which faces away from the spindle, an opening through said support intersecting said opposite faces and adapted to receive the shank portion of a cutter holder, a plate secured to but spaced from said other surface and having an opening therethrough in alignment with the opening in said support, a rod member releasably secured in said opening in said plate and having an end portion located between said other surface and said plate, a stop member adjustably carried on said end portion of said rod member for engaging the end of said shank as said shank is moved in said opening in said support to accurately position said cutter holder, a clamp member movable inwardly of said opening to engage and clamp said shank in said opening after said cutter holder has been positioned against said top, and means for moving said clamp member to effect a clamping engagement with said shank.

References Cited

UNITED STATES PATENTS

| | | | |
|---|---|---|---|
| 1,950,039 | 3/1934 | Smith et al. | 82—34 |
| 1,979,252 | 11/1934 | Chedester | 29—96 XR |
| 2,154,496 | 4/1939 | Darash | 82—24 XR |

FOREIGN PATENTS

| | | |
|---|---|---|
| 1,397,490 | 3/1965 | France. |

LEONIDAS VLACHOS, *Primary Examiner.*